(12) United States Patent
Born et al.

(10) Patent No.: US 7,048,100 B2
(45) Date of Patent: May 23, 2006

(54) PISTON/CYLINDER UNIT (75) Inventors: Frank Born, Dienethal (DE); Rolf Mintgen, Thuer (DE); Paul Muders, Rhens (DE); Wilhelm Schwab, Neuwied (DE); Andre Stein, St. Goar-Werlau (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/734,571

(22) Filed: Dec. 12, 2003

(65) Prior Publication Data
US 2004/0178034 A1    Sep. 16, 2004

(30) Foreign Application Priority Data
Dec. 14, 2002 (DE) .................. 102 58 523
Nov. 3, 2003 (DE) .................. 103 51 531

(51) Int. Cl.
F16F 9/34 (2006.01)

(52) U.S. Cl. .................. 188/322.15; 188/322.22

(58) Field of Classification Search .......... 188/322.14, 188/300, 297, 302, 303, 304, 305, 322.15, 188/322.22, 282.1
See application file for complete search history.

(56) References Cited

U.S. PATENT DOCUMENTS

| 4,099,602 A * | 7/1978 | Kourbetsos .................. 188/300 |
| 4,856,625 A | 8/1989 | Oshida |
| 5,450,933 A * | 9/1995 | Schuttler .................. 188/300 |
| 5,586,361 A | 12/1996 | Tulle et al. |
| 5,620,066 A | 4/1997 | Schüttler |
| 5,799,759 A | 9/1998 | Koch |
| 6,179,100 B1 * | 1/2001 | Mintgen et al. .......... 188/282.1 |

FOREIGN PATENT DOCUMENTS

| DE | 1459 182 | 1/1969 |
| DE | 36 42 442 C1 | 8/1987 |
| DE | 42 39 681 A1 | 6/1994 |
| DE | 44 47 272 A1 | 7/1995 |

* cited by examiner

Primary Examiner—Melanie Torres
(74) Attorney, Agent, or Firm—Cohen, Pontani, Lieberman & Pavane (57) ABSTRACT

A piston/cylinder unit has a closed cylinder with a piston axially displaceably guided therein. The piston divides the cylinder interior into first and a second working spaces which are both filled with a fluid. A first nonreturn valve is arranged in the piston having a closing element of which is force-loaded in the closing direction. At least a portion of the first nonreturn valve is exposed to pressure in the first working space. A second nonreturn valve is also arranged in the piston and also has a closing element of which is force-loaded in the closing direction. The surface of the closing element of the first and/or second nonreturn valve acted upon by the pressure of the respective working spaces can be enlarged during the opening stroke of said nonreturn valve.

29 Claims, 5 Drawing Sheets

PISTON/CYLINDER UNIT

BACKGROUND OF THE INVENTION

1. Field of the Invention

The invention relates to a piston/cylinder unit having a closed cylinder, a piston guided in an axially displaceable manner in the cylinder and sealed with respect to the cylinder by an annular seal which radially surrounds the piston, the piston dividing the cylinder interior into first and a second working spaces which are filled with a fluid, a piston rod connected to the piston and extending through the cylinder interior, an end side of the piston rod being sealingly guided to the outside of the cylinder through at least one closing wall of the cylinder, a first nonreturn valve with a closing element force-loaded in the closing direction and which can be opened connecting the first working space to the second working space under a high pressure in the first working space, and a second nonreturn valve having a closing element force-loaded in the closing direction and which can be opened connecting the second working space to the first working space under a high pressure in the second working space.

2. Description of the Related Art

Piston/cylinder units of the type described above are used, for example, as infinitely variable door arresters for motor vehicle doors. When used in this application, the two non-return valves are closed when the door is not being moved such that the door is held in the position which it has assumed at that particular instance. If the door is actuated manually to move it out of this position, a pressure is built up in one of the working chambers, the high pressure causing a non-return valve associated with that working chamber to open. Once the valve opens, fluid is allowed to flow out of the working chamber with high pressure into the other working chamber.

To open the valve, a pressure which overcomes the force loading of the closing element in the closing direction has to be built up in the working chamber. If the force of the manual actuation of the door is reduced below a certain extent before the door has been moved to its desired position, the pressure in the working chamber is reduced such that the nonreturn valve also closes and the movement of the door is blocked by the piston/cylinder unit even if a further movement of the door is still desired.

SUMMARY OF THE INVENTION

It is therefore the object of the present invention to provide a piston/cylinder unit with at least one nonreturn valves which requires a smaller holding-open pressure for holding open the nonreturn valve than the opening pressure for opening the nonreturn valve.

According to the present invention, the object is achieved by a piston/cylinder unit having a nonreturn valve in which a surface of the closing element of the nonreturn valve that can be acted upon effectively by the pressure of the working space is enlarged during the opening stroke of said nonreturn valve.

Since the effective surface of the closing element becomes larger after the nonreturn valve has been opened, the non-return valve can be held in the open position by a pressure in the working space that is smaller than the opening pressure required to open the nonreturn valve. When the piston/cylinder unit according to the present invention is used in an infinitely variable door arrester, the door which is not being moved manually is held stably in its assumed position and maintains the position in the event of, for example, an unintentional, slight application of force. If the door is consciously moved with a certain effort, i.e., an effort that creates a pressure in the working space that is greater than the opening pressure, then a corresponding high build-up of pressure in the working space also takes place and the nonreturn valve is opened. After that valve is opened, only a reduced effort is then still required for a further opening movement.

According to one embodiment of the present invention which is of simple construction, the closing element is a stepped piston displaceably arranged in a corresponding stepped hole, wherein the steps of of the piston have end-side surfaces which are acted upon effectively by the pressure of the working space. Starting in the closed position, only the smallest step is pressurized. As the stepped piston moves increasingly further along the opening stroke, further steps of the stepped piston are increasingly pressurized.

If at least the smallest surface of the nonreturn valve that can be acted upon by the pressure of the working space is a closing element of a seat valve, then the nonreturn valve may be rapidly opened when the opening pressure in the working space is reached. Upon opening the seat valve, the pressure required to keep the valve open is therefore also immediately reduced. Thus, after a movement has been initiated, a door can immediately continue to be moved with a smaller force.

The end side of the smallest step of the stepped piston may form the closing element which can be placed onto the mouth of the smallest step of the stepped hole. In this embodiment, the mouth forms a valve seat of the nonreturn valve and the smallest step leading to the working space.

The closing element may have a conical closing surface which can be placed onto the valve seat. In this embodiment, a higher degree of sealing is achieved in the closed state of the nonreturn valve if the manufacturing tolerances are relatively small. The degree of sealing is increased further if the closing element has a closing surface made of an elastomer.

One or more steps of the stepped hole may have a connection to the next-larger step. The corresponding connection to the next-higher step of the stepped hole may be opened when a certain opening stroke is reached in each case. In this embodiment, the reduction in the required holding-open pressure takes place stepwise and not suddenly.

A simple construction with few components is achieved by one or more of the steps of the stepped piston forming a slide of a slide valve, by means of which the corresponding connection leading radially into the stepped hole can be closed.

One or more of the steps of the stepped piston may have a radially encircling annular groove on their cylindrical circumferential surface in which a sealing ring is inserted to obtain a good seal alternatively and/or in addition to maintaining small tolerances. The radially encircling outer region of the sealing ring bearing in a sealing manner against the inner wall of the corresponding step of the stepped hole.

A radial connection may lead from the largest step of the stepped hole into an annular cylinder space which is formed between the inner wall of the cylinder and the radially encircling circumferential surface of the piston. The annular cylinder space is sealed by annular seals with respect to the working spaces, the pressure of which can be used to act upon the stepped piston in the opening direction. The radial connection may be closed by the largest step of the stepped piston and opened in the largest opening-stroke position of said stepped piston. The fluid can flow from the cylinder space to the other working space, i.e., the working space that is not pressurized.

For simple force-loading in the closing direction, the closing element may be loaded in the closing direction by a compression spring, in particular a helical compression spring or a disc spring, which is supported on the piston.

To damp movement of the stepped piston, the largest step of the stepped hole may form a damping chamber on the side of the stepped piston which faces away from the working chamber. The damping chamber may be connected to the cylinder interior by a damping opening. In this case, the damping opening defines the opening time of the nonreturn valve.

The damping chamber may be constructed so that the damping chamber is connected to the cylinder space by a valve when the stepped piston is moved in the closing direction. This configuration allows fluid to flow rapidly from the cylinder space to the damping chamber during a closing movement making it possible for the closing time of the nonreturn valve to be short.

This valve may be made of particularly simple construction if it has a sealing ring arranged in an annular groove which is formed on the cylindrical circumferential surface of the largest step of the stepped piston and the side of the sealing ring which faces away from the damping chamber to be connected to the cylinder space and for the flow to pass over or under the sealing ring from the cylinder space to the damping chamber.

A special installation space for the compression spring is not required if the compression spring is arranged in the damping chamber, thus enabling the piston/ cylinder unit to have a small overall length.

To ensure that the fluid flows out of the largest step of the stepped hole even in the last closing-stroke region during the closing movement of the stepped piston, the largest stepped hole can be connected to the cylinder space by a constricting opening. This connection may be arranged on that side of the corresponding step of the stepped piston which faces the working chamber.

The annular seal which surrounds the piston and provides a seal with respect to the cylinder may be arranged in an annular groove which is formed on the cylindrical circumferential surface of the piston.

The annular seal may have a sealing lip which radially encircles the piston and has a free end directed approximately towards the working space which bears resiliently against the inner wall of the cylinder. In this embodiment, a flow of fluid from the working space into the cylinder space, which is situated on the other side of the annular seal, is reliably blocked. However, the seal allows the fluid to flow without any problem from the cylinder space to the working space.

At least one step of the stepped hole may be formed by the passage hole of a pipe which is directed towards the damping chamber. A relatively small step of the stepped piston may be displaceably arranged in the passage hole. A collar-like region of the stepped piston may engage around the pipe. The collar-like region may radially surround the next-larger step of the stepped piston. This results in an arrangement of the stepped piston and stepped hole in which they are nested one in the other, and therefore in a short overall length.

The end region of the pipe which faces the damping chamber may be designed with radially continuous slots which form the radial connection between two steps of the stepped hole. The slots form, in a simple manner, a radial connection of large cross section between two steps of the stepped hole which enables a rapid flow of fluid and therefore a rapid movement of the stepped piston.

A simple refinement which incoporates a large number of elements in one component, and therefore also a reduces the outlay on production and installation, is achieved by a stepped piston made of an elastomeric material and formed integrally with the closing surface of the closing element and/or with radially encircling sealing lips on one or more steps of the stepped piston.

A short overall length and compact construction of the piston/cylinder unit is achieved providing the piston with a one-sided piston rod and having a piston-volume control chamber for receiving the amount displaced from the working space remote from the piston rod, which amount is larger than the amount displaced from the working space on the piston-rod side. The construction of the piston may be of a particularly compact design if the volume control chamber is arranged between the first and the second nonreturn valve in the piston and is connected to the cylinder space between the first and the second nonreturn valve via an inlet opening.

To avoid a sudden drop in pressure in the working space during opening of the nonreturn valve, and annoying noises caused as a result, the valve passage in a first part of the opening stroke of the closing element of the nonreturn valve may comprise a constricting passage. The constricting passage may be arranged upstream and/or downstream of the valve seat of the seat valve in the direction of flow from the first working space to the second working space and/or from the second working space to the first working space.

In one simply constructed embodiment including the constricting passage upstream of the valve seat, the stepped piston has an approximately cylindrical extension which is directed from the closing element to the working space and protrudes through the smallest step of the stepped hole. An annular gap between the encircling circumferential surface of the extension and the inner wall of the smallest step of the stepped hole forms the constricting passage.

In another embodiment in which a constricting passage is arranged downstream of the valve seat, the step of the stepped piston which is situated downstream of the valve seat of the seat valve in the direction of flow from the first working space to the second working space and/or from the second working space to the first working space has an extension which is of approximately cylindrical design. The step of the stepped piston is guided in the opening direction of the nonreturn valve by a coaxial, annular collar protruding into the second step of the stepped hole. An annular gap between the encircling circumferential surface of the extension and the inner wall of the annular collar forms the constricting passage.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references denote similar elements throughout the several views.

DETAILED DESCRIPTION OF THE PRESENTLY PREFERRED EMBODIMENTS

Figure 1:
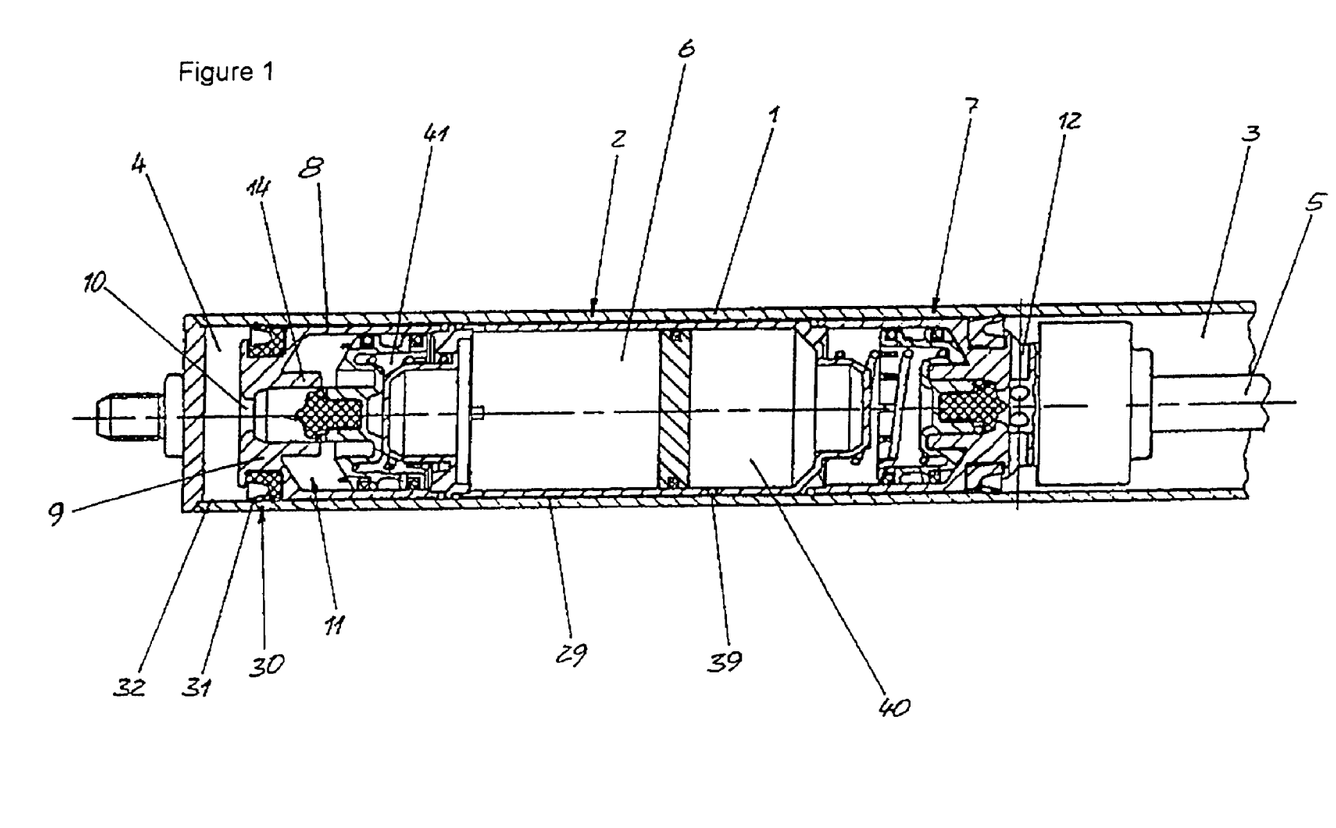
FIG. 1 is a longitudinal sectional view of a piston region of a piston/cylinder unit according to the present invention.

The piston/cylinder unit shown in FIG. 1 is a door arrester for motor vehicles which acts in an infinitely variable manner. The piston/cylinder unit includes a cylinder 1 which is closed at its ends and a piston 2 displaceably guided therein. The piston 2 divides the interior of the cylinder 1 into a first working space 3 on the piston-rod side and a second working space 4 remote from the piston rod. Both working spaces 3 and 4 are filled with oil.

A piston rod 5 is arranged on one side of the piston 2. The piston rod 5 extends through the first working space 3 and is guided to the outside of the cylinder 1 in a sealed manner by a seal (not illustrated) and by an end-side closing wall (likewise not illustrated) of the cylinder 1.

The piston 2 comprises a central volume control element 6, a first valve element 7 which adjoins the central volume control element 6 towards the first working space 3, and a second valve element 8 which adjoins the central volume control element 6 towards the second working space 4.

The volume control element 6, the first valve element 7 and the second valve element 8 are fixedly connected to one another, the first valve element 7 also having the piston rod 5 fastened to it. The first and second valve elements 7 and 8, which are of approximately cup-like design, each have a base 9 which faces the respective working space 3, 4.

Figure 2:
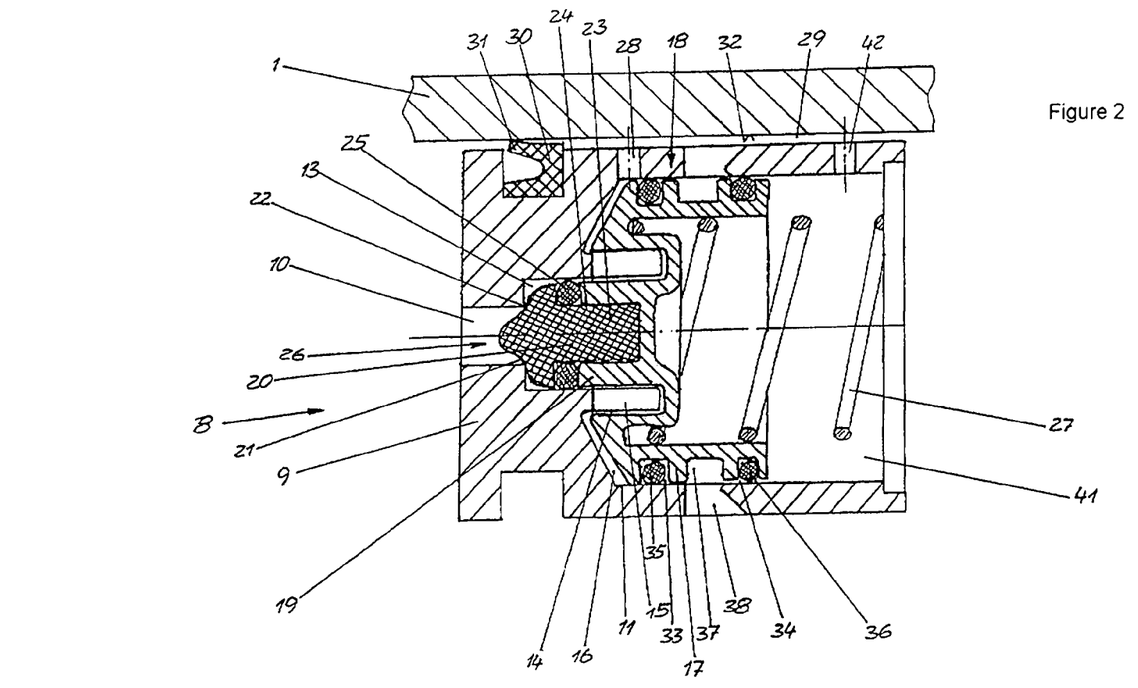
FIG. 2 is an enlarged longitudinal sectional view of the the piston of the piston/cylinder unit according to FIG. 1 in the region of a nonreturn valve.
Figure 3:
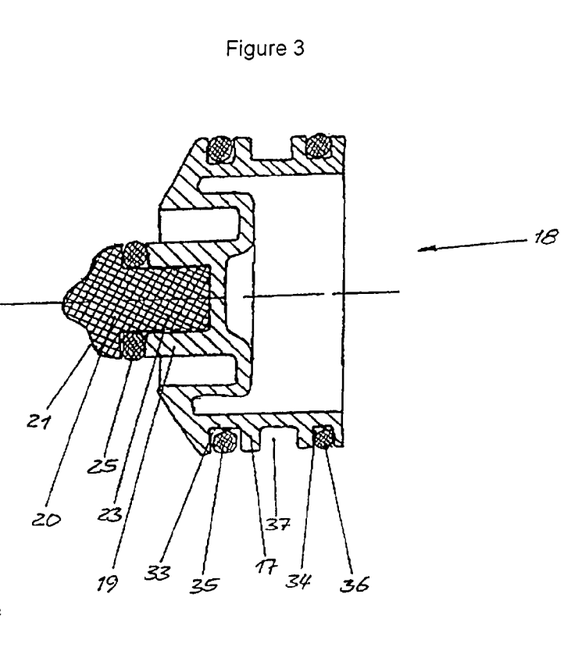
FIG. 3 is a longitudinal sectional view of a first embodiment of a stepped piston of the nonreturn valve according to FIG. 2.

Referring now also to FIGS. 2–3, the smallest step 10 of a stepped hole 11 is formed coaxially in the valve elements 7 and 8, extends through the base 9 and leads into the working space 3 or 4. In the first valve element 7, three connecting holes 12 which intersect the smallest step 10 at right angles are formed in the valve element 7 to provide a connection to the working space 3. In of the valve element 8, the smallest step 10 of the stepped hole 11 leads directly into the working space 4. Since the construction of the valve elements 7 and 8 is otherwise identical, only the second valve element 8 is described below. However, the description also applies to first valve element 7.

Following the smallest step 10 of the stepped hole 11, a second step 13 of the stepped hole 11 is formed in the base 9. The second step 13 is elongated in a direction away from the working space 4 on the base 9 by the formation of a pipe 14, which protrudes coaxially into the cup opening of the valve element 8. The end region of the pipe 14 which faces away from the working space 4 includes radially continuous slots 15. The cup opening of the valve element 8 itself forms a largest step 16 of the stepped hole 11.

Valve element 8 includes a stepped piston 18 having a largest step 17 displaceably arranged in the largest step 16 of the stepped hole 11 and a smaller step 19 displaceable in the second step 13 of the stepped hole 11. The end of the smaller step 19 of the stepped piston 18 which is directed toward the smallest step 10 of the stepped hole 11 is designed as a closing element 20 of a nonreturn valve 26 having a conical closing surface 21 which can be placed onto a valve seat 22 formed by the opening of the smallest step 10 into the second step 13 of the stepped hole 11. The closing element 20 is a separate component made of an elastomeric material. A coaxially protruding stem 23 is arranged on a side of the closing element 20 facing away from the closing surface 21, with which the closing element 20 is fixedly inserted into a corresponding blind hole 24 in the stepped piston 18.

In the stepped hole 11, the second step 13 is blocked off from the largest step 16 by a sealing ring 25 which surrounds the stem 23 on a region of the stem 23 which protrudes out of the blind hole 24. A radially encircling, outer annular surface of the sealing ring bears against the cylindrical inner wall of the second step 13 of the stepped hole 11. The blocking of the second step 13 from the largest step 16 exists in the first part of an opening stroke of the nonreturn valve 26 until the sealing ring 25 has reached the axial extent of the radial slots 15. Once this position is reached, the radial slots 15 connect the second step 13 and the largest step 16 of the stepped hole 11 and therefore also connect the second working space 4 to the largest step 16 of the stepped hole 11.

The opening movement of the stepped piston 18 takes place counter to the force of a prestressed helical compression spring 27, which acts upon the stepped piston 18 in the closing direction. When a corresponding pressure has built up in the working space 4, the pressure first acts upon the closing surface 21 of the closing element 20. After the closing element 20 has been raised from the valve seat 22, the pressure acts upon the entire end surface of the smaller step 19 of the stepped piston 18.

After the sealing ring 25 has travelled over the slots 15, the surface of the largest step 17 of the stepped piston 18 is then also acted upon by the pressure in the second working space 4.

This successive switching on of the pressurization of the steps of the stepped piston 18 allows the nonreturn valve 26 to be held open after the closing element 20 has been lifted off the valve seat 22, even when the pressure in the working space 4 is reduced below the initial opening pressure.

A constricting opening 28 leads from the base region of the largest step 16 of the stepped hole 11 into an annular cylinder space 29, which is formed between the radially encircling circumferential surface of the piston 2 and the inner wall of the cylinder 1. Respective annular seals 30 which surround the first and the second valve elements 7 and 8 provide a seal for the piston 2 with respect to the inner wall of the cylinder 1. These annular seals 30 have a radially encircling sealing lip 31 which is respectively directed with its free end approximately towards the working space 3 and 4 adjacent to its valve element 7 and 8 and bears resiliently against the inner wall 32 of the cylinder 1.

The largest step 17 of the stepped piston 18 has, on its radially encircling circumferential surface, two annular grooves 33 and 34 which are formed at an axial distance from each other and in which sealing rings 35 and 36 for sealing the stepped piston 18 with respect to the inner wall of the largest step 16 of the stepped hole 11 are arranged. Between the two annular grooves 33 and 34 provided with the sealing rings 35 and 36, a further radially encircling annular groove 37 is formed on the cylindrical circumferential surface of the largest step 17 of the stepped piston 18. In the closed position of the stepped piston 18, the annular groove 37 overlaps radially with a radial connection 38 which is formed in the largest step 17 of the stepped piston 18 and connects the annular groove 37 to the cylinder space 29.

In the position of the largest opening stroke of the stepped piston 18, the largest step 16 of the stepped hole 11 comes into connection with the radial connection 38, so that the pressurized hydraulic oil can flow out of the working space 4 through the steps 10, 13 and 16 of the stepped hole 11 and through the radial connection 38 into the cylinder space 29. Since the sealing lip 31 of the valve element 8 is pressure-loaded by the working space 4, it prevents hydraulic oil in the cylinder space 29 from flowing towards the working space 4. However, there is no such pressure-loading of the sealing lip 31 of the valve element 7. Accordingly, hydraulic oil flowing from the working space 4 into the cylinder space 29 flows over the sealing lip of the valve element 7 and passes into the working space 3. The entire piston 2 can therefore be displaced into the working space 4.

Since the volume of oil displaced from the working space 4 by the displacement of the piston 2 is larger than the volume obtained in the working space 3 which accommodates the piston rod 5, the excess volume of oil is displaced via an inlet opening 39 from the cylinder space 29 into a volume control chamber 40 of the volume control element 6.

At the end of the piston rod 5 being subjected to a force and therefore at the end of the movement of the piston 2, the oil in the working space 4 becomes unpressurized, with the result that the helical compression spring 27 displaces the stepped piston 18 into its closed position again, thereby closing the nonreturn valve 26.

In the largest step 16 of the stepped hole 11, a damping chamber 41 is formed on the side of the largest step 17 of the stepped piston 18 which faces away from the working space 4. The damping chamber is connected to the cylinder space 29 by a damping opening, as a result of which an opening movement of the stepped piston 18 is damped.

To avoid damping the closing movement, the piston 18 may be designed so that the flow of oil in the direction from the cylinder space 29 to the damping chamber passes below the sealing ring 36. This configuration allows the damping chamber 41 to be rapidly filled with oil. However, the sealing ring 26 provides a seal in the reverse direction, so that, during an opening movement, only the damping opening 42 is available as a connection of the damping chamber 41 to the cylinder space 29.

In the last part of the closing stroke, if the connection from the radial connection 38 to the largest step 16 of the stepped hole 11 is blocked before the fully closed position is reached, the rest of the oil in the largest step 16 can pass from the step 16 through the constricting opening 28 into the cylinder space 29 and from there, flowing over the sealing lip 31, which is now relieved of pressure, into the working space 4.

Figure 4:
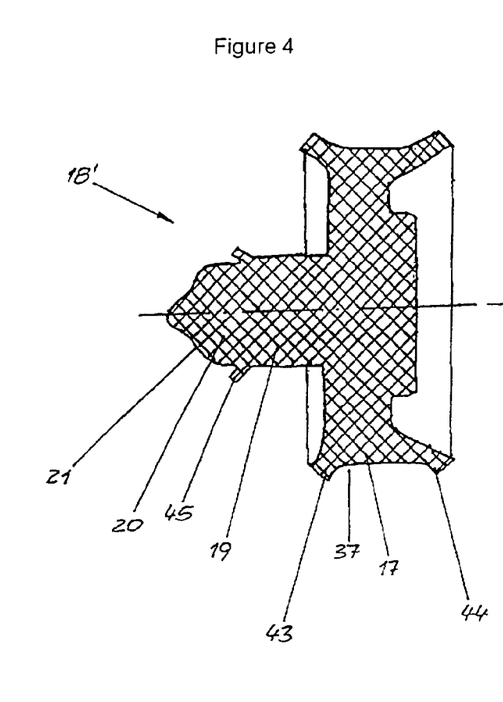
FIG. 4 is a longitudinal sectional view of a further embodiment of a stepped piston for the nonreturn valve according to FIG. 2.

A further embodiment of a stepped piston 18' shown in FIG. 4 corresponds in its construction and its function to the stepped piston 18 in FIGS. 1–3. However, the stepped piston 18' comprises one component made of an elastomer and is formed integrally with sealing lips 43 and 44, which form the sealing rings 35 and 36, with a sealing lip 45, which forms the sealing ring 25, and with the closing element 20 which has the closing surface 21.

Figure 5:
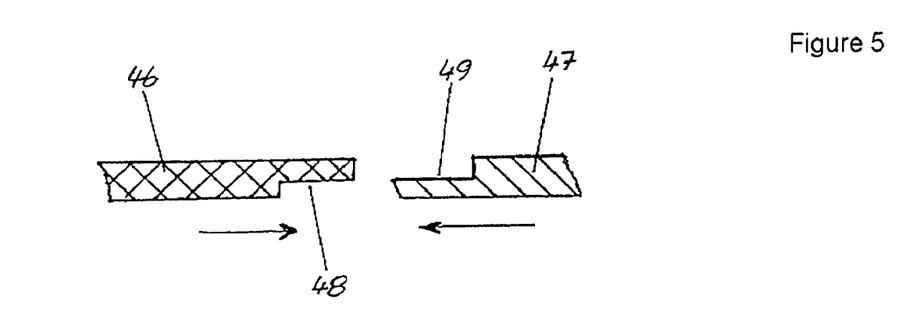
FIG. 5 is a partial sectional view of an embodiment of the connection of parts of the piston of the piston/cylinder unit according to FIG. 1.
Figure 6:
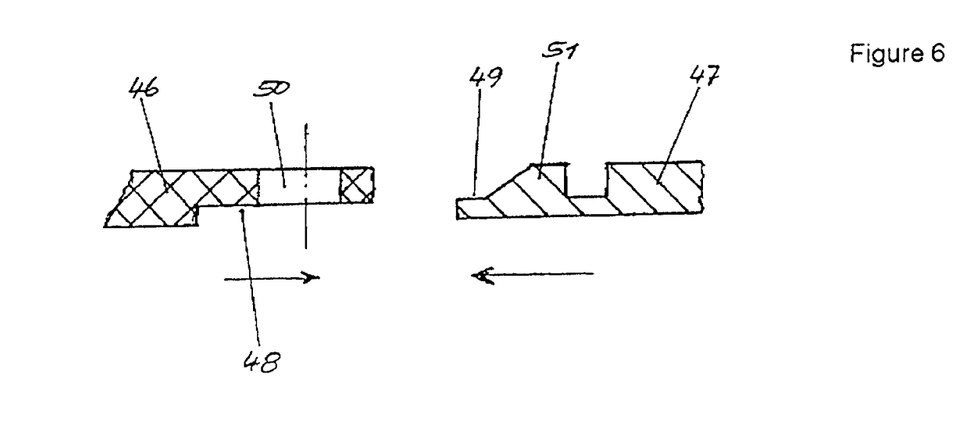
FIG. 6 is a partial sectional view of a further embodiment of the connection of parts of the piston of the piston/cylinder unit according to FIG. 1.

FIGS. 5 and 6 illustrate connections of the valve element 8 to the volume control element 6. In this case, the valve element 8 has a coaxial, annular end 46 and the volume control element 6 has a coaxial, annular end 47. Both annular ends 46 and 47 have the same outside diameter. The annular end 46 has, on its inner circumference, an annular step 48 which enlarges the diameter, and the annular end 47 has, on its outside diameter, a corresponding annular step 49 which reduces the diameter. The annular steps 48 and 49 are pushed telescopically into each other and are connected to each other.

In the embodiment of FIG. 5, the connection is a material-bonding connection, such as, for example, laser welding. In the embodiment of FIG. 6, a radial latching opening 50 is formed in the region of the annular step 48, into which a corresponding radially outwardly protruding latching lug 51 on the annular step 49 can be latched when the annular steps 48 and 49 are pushed telescopically into each other.

Figure 7:
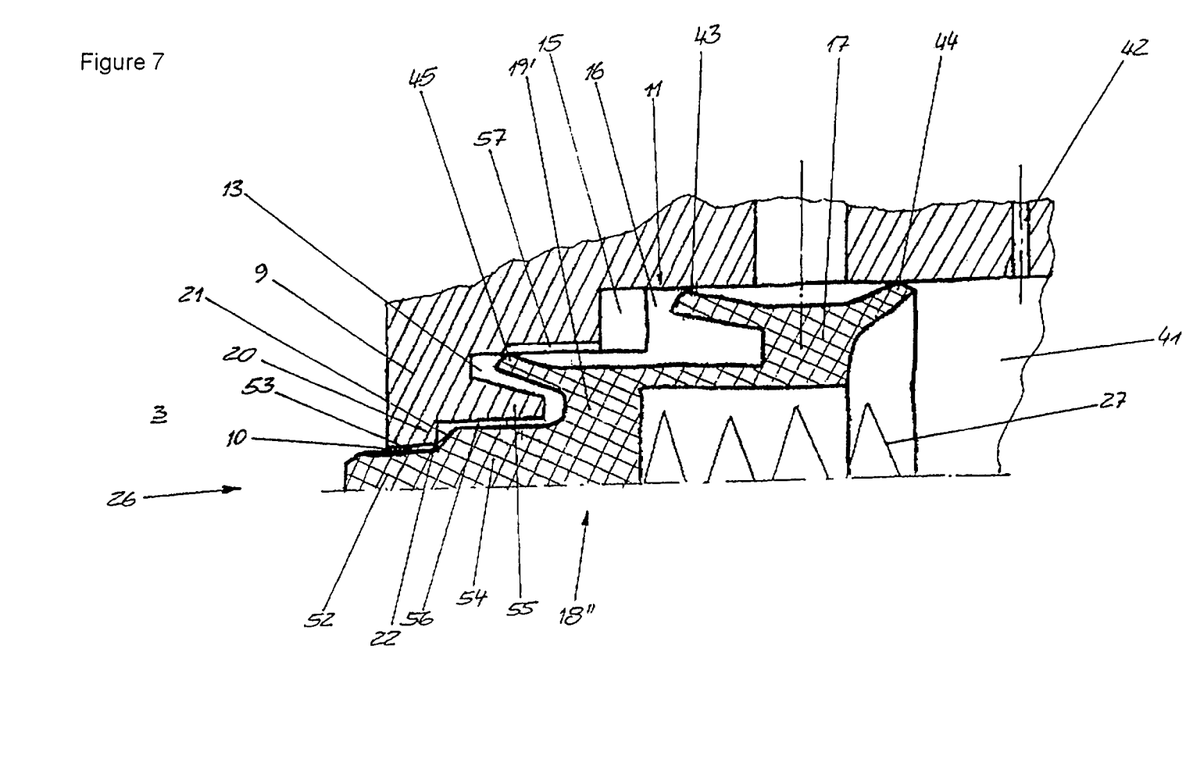
FIG. 7 is an enlarged partial sectional view of yet another embodiment of a piston of the piston/cylinder unit according to FIG. 1 in the region of a nonreturn valve.

The basic construction of the embodiment of FIG. 7 corresponds to the embodiment illustrated in FIG. 2. In FIG. 7, a stepped piston 18" is designed analogously to the stepped piston 18' illustrated in FIG. 4 as a component made of an elastomer.

In the embodiment of FIG. 7, the stepped piston 18" has a cylindrical extension 52 which is directed from the closing element 20 toward the working space 3 and protrudes through the smallest step 10 of the stepped hole 11. The annular gap 53 formed between the encircling circumferential surface of the extension 52 and the inner wall of the smallest step 10 of the stepped hole 11 acts as a constricting passage.

That end of the extension 52 which is opposite the free end of the stepped piston 18" is adjoined in a conically widening manner by a closing surface 21 which then merges into a further cylindrical extension 54 of the stepped piston 18". The further extension 54 is guided through a coaxial, annular collar 55 which protrudes freely into the second step 13 of the stepped hole 11 in the opening direction of the nonreturn valve 26. The annular gap 56 between the encircling circumferential surface of the extension 54 and the inner wall of the annular collar 55 forms a further constricting passage.

Since the length of the smallest step 10 of the stepped hole 11 is smaller than the length of the extension 52, the constricting length remains constant during a first part of an opening stroke of the stepped piston 18". Only over the further course of the opening stroke is the overlap of the smallest step 10 and extension 52. The length of the constricting passage is also reduced.

At the same time, the length of the annular gap 56 between the extension 54 and the, collar 55 is also reduced as the stepped piston 18" travels along its opening stroke. Correspondingly, the length of the constricting passage is also reduced.

Since, however, the length of the extension 54 is greater than the length of the extension 52, a complete opening of the passage from the working space 4 to the second step of the stepped hole 11 is achieved only when the extension 54 is situated outside the collar 55.

An axial control groove 57 is formed in the wall of the second step 13 of the stepped hole 11 and can be used to already produce a limited connection to the largest step 16 of the stepped hole before the second step 13 is opened.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston/cylinder unit, comprising:
 a closed cylinder defining a cylinder interior;
 a piston axially displaceably guided in said closed cylinder and having an annular seal, said piston dividing said cylinder interior into first and second working spaces, each of said first and second working spaces being filled with hydraulic fluid;
 a piston rod connected to said piston, said piston rod extending through the cylinder interior and sealingly guided to the outside of the cylinder through a closing wall of said cylinder;
 a first nonreturn valve arranged in said piston and having a first closing element which is force-loaded in a closing direction toward a closed position, said first closing element being openable for connecting said first working space to said second working space when a pressure in said first working space exceeds a first opening pressure; and
 a second nonreturn valve arranged in said piston and having a second closing element which is force-loaded in a closing direction toward a closed position, said second closing element being openable for connecting said second working space to said first working space when a pressure in said second working space exceeds a second opening pressure,
 wherein a surface area of one of said first and second closing elements that is acted upon by a pressure in the respective one of said first and second working spaces increases when said one of said first and second closing elements moves along an opening stroke from the closed position toward an open position, and
 wherein said one of said first and second nonreturn valves comprises a stepped piston which is arranged displaceably in a corresponding stepped hole defined in said one of said first and second nonreturn valves, said stepped piston having steps with end-side surfaces which can be acted upon effectively by the pressure of the respective one of said first and second working space comprising a smallest step and a further step, only said smallest step being pressurized in the closed position, said further step being pressurized when said closing element is moved along said opening stroke away from said closed position, and at least one step of the steps in said stepped hole have a connection to a next-larger step of the steps in said stepped hole, said connection being openable when a position along the opening stroke is reached by said stepped piston.

2. The piston/cylinder unit of claim 1, wherein at least the smallest surface of the one of said first and second nonreturn valves that is acted upon by the pressure of the respective one of said first and second working spaces comprises a closing element of a seat valve.

3. The piston/cylinder unit of claim 2, wherein said closing element of a seat valve is movable onto a mouth of the smallest step of the stepped hole, said mouth forming a valve seat of said one of said first and second nonreturn valves, the smallest step of said stepped hole being in communication said working space.

4. The piston/cylinder unit of claim 3, wherein said closing element has a conical closing surface movable onto said valve seat.

5. The piston/cylinder unit of claim 2, wherein said closing element includes a closing surface made of an elastomer.

6. The piston/cylinder unit of claim 1, wherein at least one of the steps of said stepped piston forms a slide of a slide valve for selectively closing said connection in the stepped hole.

7. The piston/cylinder unit of claim 6, wherein at least one of the steps of said stepped piston have an encircling annular groove on a cylindrical circumferential surface, a sealing ring being inserted in said encircling annular groove, the sealing ring sealingly bearing against an inner wall of the corresponding step of said stepped hole.

8. The piston/cylinder unit of claim 1, further comprising a radial connection leading from a largest step of said stepped hole into an annular cylinder space defined between an inner wall of said cylinder and an encircling circumferential surface of said piston, said annular seal of said piston comprising two annular seals sealing said annular cylinder space with respect to said first and second working spaces, said radial connection being closeable by the largest step of said stepped piston and openable in a fully open position of said stepped piston along the opening stroke.

9. The piston/cylinder unit of claim 1, further comprising a compression spring loading the one of said first and second closing elements corresponding to said one of said first and second nonreturn valves in the closing direction, said spring being supported on said piston.

10. The piston/cylinder unit of claim 9, wherein said compression spring comprises one of a helical compression spring and a disc spring.

11. The piston/cylinder unit of claim 8, wherein the largest step of said stepped hole defines a damping chamber which is connected to said annular cylinder space by a damping opening in said piston, said damping chamber being on a side of said stepped piston facing away from the one of said first and second working chambers.

12. The piston/cylinder unit of claim 11, wherein said damping chamber is connectable to said cylinder space by a valve when said stepped piston is moved toward the closed position.

13. The piston/cylinder unit of claim 12, wherein said valve comprises a sealing ring arranged in an annular groove formed on the cylindrical circumferential surface of the largest step of said stepped piston, a side of said sealing ring facing away from said damping chamber being connected to said cylinder space such that a flow passes said sealing ring from said cylinder space to said damping chamber when said stepped piston is moved toward the closed position.

14. The piston/cylinder unit of claim 8, further comprising a compression spring loading the one of said first and second closing elements corresponding to said one of said first and second nonreturn valves in the closing direction, wherein said compression spring is arranged in said damping chamber.

15. The piston/cylinder unit of claim 1, wherein the largest step of said stepped hole is connected on the side of the corresponding step of said stepped piston which faces the one of said first and second working chambers, to the cylinder space by a constricting opening.

16. The piston/cylinder unit of claim 1, wherein said annular seal is arranged in an annular groove which is formed on the cylindrical circumferential surface of the piston.

17. The piston/cylinder unit of claim 1, wherein said annular seal comprises a radially encircling sealing lip having a free end directed approximately towards the one of said first and second working spaces, said free end bearing resiliently against an inner wall of said cylinder.

18. The piston/cylinder unit of claim 1, wherein said stepped piston comprises an elastomeric material formed integrally with a closing surface of the closing element.

19. The piston/cylinder unit of claim 18, wherein said stepped piston further comprises radially encircling sealing lips on one or more of the steps of said stepped piston.

20. The piston/cylinder unit of claim 1, comprises an elastomeric material formed integrally with radially encircling sealing lips on one or more of the steps of said stepped piston.

21. The piston/cylinder unit of claim 1, wherein a valve passage defined by said one of said first and second closing elements in a first part of the opening stroke of said one of said first and second nonreturn valves is a constricting passage.

22. A piston/cylinder unit, comprising:
a closed cylinder defining a cylinder interior;
a piston axially displaceably guided in said closed cylinder and having an annular seal, said piston dividing said cylinder interior into first and second working spaces, each of said first and second working spaces being filled with hydraulic fluid;
a piston rod connected to said piston, said piston rod extending through the cylinder interior and sealingly guided to the outside of the cylinder through a closing wall of said cylinder;
a first nonreturn valve arranged in said piston and having a first closing element which is force-loaded in a closing direction toward a closed position, said first closing element being openable for connecting said first working space to said second working space when a pressure in said first working space exceeds a first opening pressure; and
a second nonreturn valve arranged in said piston and having a second closing element which is force-loaded in a closing direction toward a closed position, said second closing element being openable for connecting said second working space to said first working space when a pressure in said second working space exceeds a second opening pressure,
wherein a surface area of one of said first and second closing elements that is acted upon by a pressure in the respective one of said first and second working spaces increases when said one of said first and second closing elements moves along an opening stroke from the closed position toward an open position,
wherein said one of said first and second nonreturn valves comprises a stepped piston which is arranged displaceably in a corresponding stepped hole defined in said one of said first and second nonreturn valves, said stepped piston having steps with end-side surfaces which can be acted upon effectively by the pressure of the respective one of said first and second working space comprising a smallest step and a further step, only said smallest step being pressurized in the closed position, said further step being pressurized when said closing element is moved along said opening stroke away from said closed position, and
wherein said at least one stepped hole is defined by a passage hole of a pipe and is directed towards said damping chamber, wherein the smallest step of said stepped piston is displaceably arranged in said passage hole, a collar-like region of said stepped piston engaging around a region of said pipe.

23. The position/cylinder unit of claim 22, wherein at least one step of the steps in said stepped hole have a connection to a next-larger step of the steps in said step hole, wherein said connection is openable when a position along the opening stroke is reached by said stepped piston.

24. The piston/cylinder unit of claim 22, wherein an end region of said pipe facing said damping chamber includes radially continuous slots which form a radial connection between two steps of said stepped hole.

25. A piston/cylinder unit, comprising:
a closed cylinder defining a cylinder interior;
a piston axially displaceably guided in said closed cylinder and having an annular seal, said piston dividing said cylinder interior into first and second working spaces, each of said first and second working spaces being filled with hydraulic fluid;
a piston rod connected to said piston, said piston rod extending through the cylinder interior and sealingly guided to the outside of the cylinder through a closing wall of said cylinder;
a first nonreturn valve arranged in said piston and having a first closing element which is force-loaded in a closing direction toward a closed position, said first closing element being openable for connecting said first working space to said second working space when a pressure in said first working space exceeds a first opening pressure; and
a second nonreturn valve arranged in said piston and having a second closing element which is force-loaded in a closing direction toward a closed position, said second closing element being openable for connecting said second working space to said first working space when a pressure in said second working space exceeds a second opening pressure,
wherein a surface area of one of said first and second closing elements that is acted upon by a pressure in the respective one of said first and second working spaces increases when said one of said first and second closing elements moves along an opening stroke from the closed position toward an open position, and
wherein said piston rod comprises a one-sided piston rod and said piston comprises a volume control chamber for receiving the amount displaced from the second working space remote from said piston rod, which amount is larger than the amount displaced from said first working space on the piston-rod side.

26. The piston/cylinder unit of claim 25, wherein the volume control chamber is arranged between said first and the second nonreturn valves in said piston and is connected to an annular cylinder space defined between an inner wall of said cylinder and an encircling circumferential surface of said piston between the first and the second nonreturn valves, the connection being made through an inlet opening.

27. A piston/cylinder unit, comprising:
a closed cylinder defining a cylinder interior;
a piston axially displaceably guided in said closed cylinder and having an annular seal, said piston dividing said cylinder interior into first and second working spaces, each of said first and second working spaces being filled with hydraulic fluid;
a piston rod connected to said piston, said piston rod extending through the cylinder interior and sealingly guided to the outside of the cylinder through a closing wall of said cylinder;
a first nonreturn valve arranged in said piston and having a first closing element which is force-loaded in a closing direction toward a closed position, said first closing element being openable for connecting said first working space to said second working space when a pressure in said first working space exceeds a first opening pressure; and
a second nonreturn valve arranged in said piston and having a second closing element which is force-loaded in a closing direction toward a closed position, said second closing element being openable for connecting said second working space to said first working space when a pressure in said second working space exceeds a second opening pressure,
wherein a surface area of one of said first and second closing elements that is acted upon by a pressure in the respective one of said first and second working spaces increases when said one of said first and second closing elements moves along an opening stroke from the closed position toward an open position,
wherein a valve passage defined by said one of said first and second closing elements in a first part of the opening stroke of said one of said first and second nonreturn valves is a constricting passage, and
wherein said one of said first and second nonreturn valves comprises a stepped piston which is arranged displaceably in a corresponding stepped hole defined in said one of said first and second nonreturn valves, said stepped piston having steps with end-side surfaces which can be acted upon effectively by the pressure of the respective one of said first and second working space comprising a smallest step and a further step, only said smallest step being pressurized in the closed position, said further step being pressurized when said closing element is moved along said opening stroke away from said closed position, wherein at least the smallest surface of the one of said first and second nonreturn valves that is acted upon by the pressure of the respective one of said first and second working spaces comprises a closing element of a seat valve, and wherein said constricting passage is arranged upstream and/or downstream of said valve seat of said seat valve relative to the direction of flow between said first and second working spaces.

28. The piston/cylinder unit of claim 27, wherein said closing element of a seat valve is movable onto a mouth of the smallest step of the stepped hole, said mouth forming a valve seat of said one of said first and second nonreturn valves, the smallest step of said stepped hole being in communication said working space, and wherein said stepped piston has an approximately cylindrical extension directed from said one of said first and second closing elements to the corresponding one of said first and second working spaces, said cylindrical extension protruding through said smallest step of said stepped hole, wherein the constricting passage is defined by an annular gap between the encircling circumferential surface of said cylindrical extension and the inner wall of the smallest step of the stepped hole.

29. The piston/cylinder unit of claim 27, wherein a step of said stepped piston on a side of said valve seat facing away from said corresponding one of said first and second working space comprises a cylindrical extension, said base defining an annular collar protruding into the second step of said stepped hole in the opening direction of said one of said first and second nonreturn valves for guiding said cylindrical extension, an annular gap defined between the encircling circumferential surface of said cylindrical extension and an inner wall of said annular collar forming the constricting passage.

* * * * *